United States Patent
Lee et al.

(10) Patent No.: US 10,483,544 B2
(45) Date of Patent: Nov. 19, 2019

(54) LITHIUM SECONDARY BATTERIES

(71) Applicant: SK Innovation Co., Ltd., Seoul (KR)

(72) Inventors: Jee Hee Lee, Daejeon (KR); Sang Jin Kim, Daejeon (KR); Hyo Sang Kim, Daejeon (KR); Jung Hwan Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 310 days.

(21) Appl. No.: 15/447,708

(22) Filed: Mar. 2, 2017

(65) Prior Publication Data

US 2017/0256796 A1 Sep. 7, 2017

(30) Foreign Application Priority Data

Mar. 4, 2016 (KR) .................. 10-2016-0026074

(51) Int. Cl.
*H01M 4/587* (2010.01)
*H01M 10/0525* (2010.01)
*H01M 10/0569* (2010.01)
*H01M 4/02* (2006.01)

(52) U.S. Cl.
CPC ....... *H01M 4/587* (2013.01); *H01M 10/0525* (2013.01); *H01M 10/0569* (2013.01); *H01M 2004/021* (2013.01); *H01M 2004/027* (2013.01); *H01M 2300/004* (2013.01); *H01M 2300/0028* (2013.01)

(58) Field of Classification Search
CPC ............ H01M 4/587; H01M 10/0525; H01M 10/0569; H01M 2004/021; H01M 2004/027; H01M 2300/004; H01M 2300/0028
See application file for complete search history.

(56) References Cited

U.S. PATENT DOCUMENTS

2015/0147657 A1   5/2015   Yagishita et al.

FOREIGN PATENT DOCUMENTS

| JP | 2003-272625 | * | 9/2003 |
| KR | 1020150030705 A | | 3/2015 |

* cited by examiner

*Primary Examiner* — Laura Weiner

(74) *Attorney, Agent, or Firm* — The Webb Law Firm

(57) ABSTRACT

Provided is a lithium secondary battery including an anode containing agglomerate artificial graphite having pores with an average diameter of 80 to 150 nm; and an electrolyte solution having a viscosity of 5.0 cP or less at 25° C. The lithium secondary battery according to the present invention may have excellent life characteristics, high temperature storage characteristics and output characteristics.

7 Claims, 1 Drawing Sheet

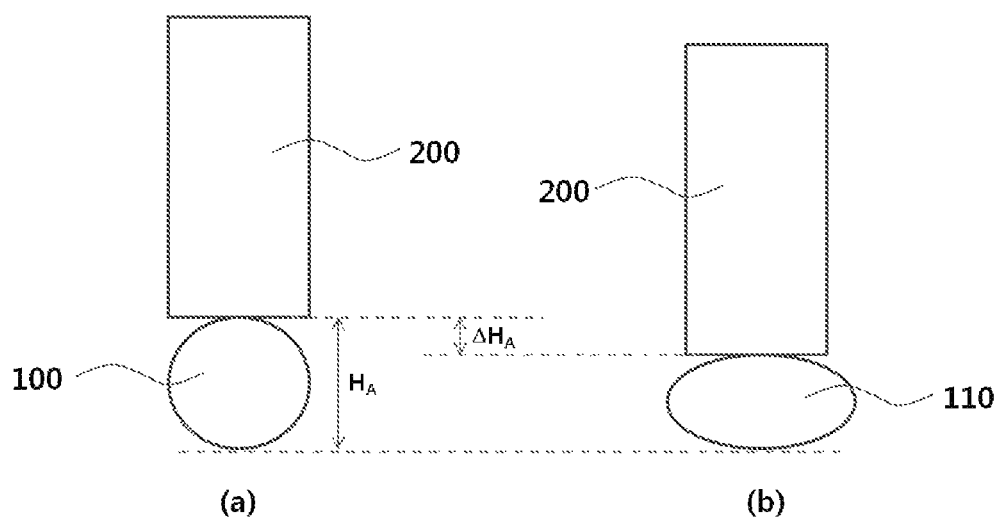

LITHIUM SECONDARY BATTERIES

CROSS-REFERENCE TO RELATED APPLICATION

This application claims priority to Korean Patent Application No. 10-2016-0026074 filed Mar. 4, 2016, the disclosure of which is hereby incorporated in its entirety by reference.

TECHNICAL FIELD

The following disclosure relates to a lithium secondary battery having excellent life characteristics, high temperature storage characteristics and output characteristics.

BACKGROUND

As the development technique and demand for a mobile device have increased, the demand for a secondary battery as an energy source has rapidly increased, and among the secondary batteries, a lithium secondary battery having high energy density and voltage is commercialized and widely used.

In particular, a lithium secondary battery for an electric vehicle requires good long life characteristics and storage characteristics at high temperature due to the characteristics of the place where it is used, and in order to implement this, artificial graphite is widely used.

However, though the artificial graphite shows excellent life characteristics and high temperature storage characteristics as compared with natural graphite, there are problems of a high manufacture cost, a low capacity, and reduced output characteristics due to increased battery resistance.

In order to improve the resistance characteristics of the artificial graphite as such, carbon is coated on the surface of the artificial graphite, or conductive materials having excellent conductivity is added thereto to decrease the resistance of an anode, however, a trade-off phenomenon to reduce the reliability and stability of the battery is shown, which is difficult to be improved, even in the case of changing a solvent composition of an electrolyte solution and an additive composition.

Accordingly, there is currently a need to develop a lithium secondary battery having excellent life characteristics and high temperature storage characteristics which are the merits of artificial graphite, and also having improved output characteristics.

As a similar related document to this, Korean Patent Laid-Open Publication No. 10-2015-0030705 (Mar. 20, 2015) has been published.

RELATED ART DOCUMENT

Patent Document

Korean Patent Laid-Open Publication No. 10-2015-0030705 (Mar. 20, 2015)

SUMMARY

An embodiment of the present invention is directed to providing a lithium secondary having excellent life characteristics and high temperature storage characteristics, and also having improved output characteristics.

In one general aspect, a lithium secondary battery includes: an anode containing agglomerate artificial graphite having pores with an average diameter of 80 to 150 nm; and an electrolyte solution having a viscosity of 5.0 cP or less at 25° C.

Other features and aspects will be apparent from the following detailed description, the drawing, and the claims.

BRIEF DESCRIPTION OF THE DRAWINGS

FIG. 1 illustrates a method of measuring an average particle diameter variation of the agglomerate artificial graphite according to an exemplary embodiment of the present invention, in which (a) is the agglomerate artificial graphite before applying a pressure of 4 mN/cm$^2$, and (b) is the agglomerate artificial graphite after applying a pressure of 4 mN/cm$^2$.

DETAILED DESCRIPTION OF MAIN ELEMENTS

100: Agglomerate artificial graphite before applying a pressure of 4 mN/cm$^2$
110: Agglomerate artificial graphite after applying a pressure of 4 mN/cm$^2$
200: Tip

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the lithium secondary battery according to the present invention will be described in detail with reference to the accompanying drawing. The drawing to be provided below is provided by way of example so that the idea of the present invention can be sufficiently transferred to a person skilled in the art to which the present invention pertains. Therefore, the present invention is not limited to the drawing provided below but may be modified in many different forms. In addition, the drawing suggested below will be exaggerated in order to clarify the spirit and scope of the present invention. In addition, like reference numerals denote like elements throughout the specification.

Technical terms and scientific terms used herein have the general meaning understood by a person skilled in the art to which the present invention pertains unless otherwise defined, and a description for the known function and configuration obscuring the present invention will be omitted in the following description and the accompanying drawings.

The present invention relates to a lithium secondary battery, which maintains excellent life characteristics and high temperature storage characteristics of artificial graphite, and also reduces battery resistance to improve output characteristics.

Specifically, the lithium secondary battery according to the present invention may include: an anode containing agglomerate artificial graphite having pores with an average diameter of 80 to 150 nm; and an electrolyte solution having a viscosity of 5.0 cP or less at 25° C. As such, by immersing an anode containing agglomerate artificial graphite having pores with an average diameter of 80 to 150 nm, prepared using agglomerate artificial graphite, in an electrolyte solution having a viscosity of 5.0 cP or less at 25° C., a wetting effect is improved, and battery resistance is reduced, thereby improving output characteristics.

More preferably, the agglomerate artificial graphite has pores with an average diameter of 100 to 150 nm, thereby being effective in improving immersion characteristics due to the use of a low viscosity electrolyte solution having a viscosity of 5.0 cP or less at 25° C., and still more preferably, when the agglomerate artificial graphite has pores with an average diameter of 100 to 150 nm, the low viscosity electrolyte solution may have a viscosity of 4.9 cP or less at 25° C.

Further, the agglomerate artificial graphite according to an exemplary embodiment of the present invention may have an appropriate particle strength range, and thus, adhesion between particles may be improved when preparing the anode, and the physical stability of the anode may be secured.

Specifically, the agglomerate artificial graphite may satisfy the following Equation 1:

$$0.1 \leq \Delta H_A/H_A \leq 0.4 \qquad \text{[Equation 1]}$$

wherein $H_A$ is an average particle diameter (μm) of the agglomerate artificial graphite; and $\Delta H_A$ is an average particle diameter variation (μm) of the agglomerate artificial graphite when applying a pressure of 4 mN/cm$^2$.

By satisfying the above range, the graphite may have particle strength which is neither too high, nor too low, and thus, in a rolling process for preparing an anode, packing is performed better between the agglomerate artificial graphite, so that the anode may have excellent electrical conductivity and physical stability.

More preferably, the agglomerate artificial graphite according to an exemplary embodiment of the present invention may satisfy the following Equation 1-1:

$$0.12 \leq \Delta H_A/H_A \leq 0.35 \qquad \text{[Equation 1-1]}$$

By satisfying the above range, the packing effect may be more improved, thereby having better physical stability, and thus, the life characteristics of the secondary battery may be more improved.

Here, the average particle diameter variation may be obtained by applying a pressure of 4 mN/cm$^2$ to each grain of a plurality of sample grains using a tip and the like, and averaging the variation, in which a plurality of grains may refer to 5 or more grains. In addition, the particle diameter variation may refer to a height change of a sample grain, that is, a distance change between the bottom and the tip when measuring the particle diameter variation, as shown in FIG. 1.

As shown in Equation 1, the agglomerate artificial graphite according to an exemplary embodiment of the present invention has an average particle diameter (thickness) decreased by 10 to 40% when applying a pressure of 4 mN/cm$^2$, and thus, it has an appropriate particle strength so that it is crushed to be closely packed by a rolling process when preparing an anode, thereby having improved close adhesion. However, where the particle strength is too high, that is, the agglomerate artificial graphite is too hard, the particles are not easily crushed so that wide pores are formed between the particles to decrease electrical conductivity between the particles, and also as the size of the pores is increased, the close adhesion between an anode mixture and a current collector, thereby decreasing physical stability, and thus, deteriorating the life characteristics. In addition, where the particle strength is too low, structural stability of the electrode may be decreased, thereby deteriorating the life characteristics of the battery.

Here, the upper limit of $\Delta H_A$ may vary with the average particle diameter of the agglomerate artificial graphite, and specifically, the average particle diameter of the agglomerate artificial graphite may be 5 to 30 μm, more preferably 10 to 20 μm. Where the average particle diameter is less than 5 μm, a large amount of binder is needed in the manufacture of a secondary battery, due to the increase in the number of artificial graphite particles per a unit volume, and thus, the capacity of the battery may be lowered, and also the life characteristics thereof may be deteriorated. Where the average particle diameter is above 30 μm, particle swelling of the artificial graphite is increased when charging/discharging, and as the charging/discharging is repeated, binding properties between the particles and between the particle and the current collector may be lowered, thereby deteriorating the life characteristics.

In addition, the agglomerate artificial graphite according to an exemplary embodiment of the present invention may have a true density of 2 to 2.5 g/cm$^3$, a specific surface area of 0.5 to 5 m$^2$/g, and Lc(002) of 3.355 to 3.361, in which Lc(002) is the size of a crystallite in a C-axis direction when measuring an X-ray diffraction pattern.

In addition, the anode according to an exemplary embodiment of the present invention may further contain a conductive material, a binder or a thickener which are commonly used in the art, in addition to the agglomerate artificial graphite. The added amount of each material may be 0.1-10 parts by weight of the conductive material, 0.1-5 parts by weight of the binder, and 0.1-5 parts by weight of the thickener, based on 100 parts by weight of the agglomerate artificial graphite.

The conductive material according to an exemplary embodiment is not particularly limited as long as it is commonly used in the art, however, as a specific example thereof, it may be any one or two or more selected from the group consisting of carbon black such as Super-P carbon black, acetylene black, ketjen black, channel black, furnace black, lamp black, thermal black and the like; metal powder such as copper, silicon, tin and zinc powder; conductive whisker such as zinc oxide and potassium titanate; conductive metal oxides such as titanium oxide; and conductive carbon materials such as graphene, carbon fiber, a polyphenylene derivative, and the like.

The binder according to an exemplary embodiment is a component allowing the binding of the agglomerate artificial graphite and the conductive material, and the binding of the anode mixture and the current collector to be more effective, and is not particularly limited as long as it is commonly used in the art, and may be, for example, any one or two or more selected from the group consisting of polyvinylidene fluoride (PVdF), hexafluoropropylene (HFP), polyvinylidene fluoride-co-hexafluoro propylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, pullulan, cyanoethylsucrose, carboxyl methyl cellulose, styrene-butadiene rubber, acrylonitrile-styrene-butadiene copolymer, polyimide and the like.

The thickener according to an exemplary embodiment is not particularly limited as long as it is commonly used in the art, however, as a specific example, it may be any one or two or more selected from the group consisting of carboxylmethyl cellulose (CMC), carboxylethyl cellulose (CEC), ethyl cellulose (EC), hydroxymethyl cellulose (HMC), hydroxypropyl cellulose (HPC), carboxylethylmethyl cellulose (CEMC) and the like.

The electrolyte solution according to an exemplary embodiment of the present invention may improve the output characteristics of the battery by properly adjusting the viscosity. Specifically the electrolyte solution according to an exemplary embodiment of the present invention may have a viscosity of 5.0 cP or less, more preferably 4.9 cP or less. The lower limit of the viscosity is not particularly limited, however, may be 4.8 cP or more as a non-limiting specific example. By using the electrolyte solution having low viscosity as such, the immersion characteristics with the anode when manufacturing the battery may be improved, and by reducing internal resistance, the output characteristics may be improved.

The electrolyte solution according to an exemplary embodiment for satisfying this may be a solution containing a first solvent including ethylmethyl carbonate (EMC), diethyl carbonate (DEC) or a mixed solution thereof. The first solvent is a non-aqueous solvent having relatively very low viscosity, and by using ethylmethyl carbonate and/or diethyl carbonate, adjustment may be performed so that the electrolyte solution has a viscosity of 5.0 cP or less.

Here, it is preferred that the first solvent is added at 70 to 80 vol % based on the total volume of the electrolyte solution, and it is more preferred that the first solvent contains 55 to 80 vol % of ethylmethyl carbonate, more preferably 55 to 75 vol % of ethylmethyl carbonate, based on the total volume of the electrolyte solution, so that the electrolyte solution has a viscosity of 5.0 cP or less to reduce the internal resistance and improve the output characteristics.

In addition, the electrolyte solution according to an exemplary embodiment of the present invention may further contain a second solvent which is commonly used in the art, in addition to the first solvent. The second solvent is a non-aqueous solvent having relatively high viscosity as compared with the first solvent, and may be used together with the first solvent for improving a charge/discharge capacity and the like, however, where the added amount of the second solvent is too large, the viscosity of the electrolyte solution is increased to lower the internal resistance decreasing effect, and thus, it is preferred to use the second solvent as a mixture at an appropriate ratio. As a non-limiting specific example, the second solvent may be a carbonate-based solvent which is a mixed solvent of any one or two or more selected from the group consisting of dimethyl carbonate (DMC), dipropyl carbonate (DPC), methylpropyl carbonate (MPC), ethylpropyl carbonate (EPC), ethylene carbonate (EC), propylene carbonate (PC), butylene carbonate (BC) and the like.

Besides, the electrolyte solution may further contain a lithium salt as an electrolyte. The lithium salt may not be particularly limited as long as it is commonly used in the art, and as a non-limiting specific example thereof, it may be any one or two or more selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, LiCl, LiI and the like.

Hereinafter, the lithium secondary battery according to the present invention will be described in more detail by the following Examples. However, the following Examples are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain exemplary embodiment, and not intended to limit the present invention. Further, unless otherwise stated, the unit of added materials herein is wt %.

The physical properties of the lithium secondary battery manufactured by the following Examples and Comparative Examples were measured as follows:

(Life Characteristics)

All batteries were manufactured into the cells having a large capacity of 10 Ah or more using the same cathode, and then evaluated for a battery life in a chamber maintained at a fixed temperature (25° C.) set within a range of DOD90 at 1C charge/1C discharge c-rate.

(High Temperature Storage Characteristics)

All batteries were manufactured into the cells having a large capacity of 10 Ah or more using the same cathode, and then charged under a constant current (CC) condition up to 4.2 V at 1C rate, and then constant voltage (CV) up to 0.1 C was applied thereto to perform a full charge. Fully charged cells were left in a chamber maintained at a fixed temperature (60° C.) for a period of time, and then were taken out of the chamber, and sufficiently cooled, and then the capacity of the cells was measured.

(Resistance Characteristics)

Charge/discharge current was flown into the cells as initially manufactured cells in an order of 0.2C/0.5C/1C/2C/3C c-rate, and the points on the VI graph were connected by a straight line, respectively, and the resistance value was calculated by the slope value of the graph.

(Average Particle Diameter Variation)

The average particle diameter variation is obtained by applying a pressure of 4 $mN/cm^2$ to each grain of 5 sample grains using a tip, thereby measuring each particle diameter variation, and then averaging these.

PREPARATION EXAMPLE 1

The agglomerate artificial graphite satisfying the physical properties listed in the following Table 1 was used to prepare the anode for a lithium secondary battery.

Specifically, the agglomerate artificial graphite satisfying the physical properties listed in Table 1, and a 5:5 mixture of styrene-butadiene rubber (SBR) carboxylmethyl cellulose (CMC) as an aqueous binder were prepared, and carbon black as a conductive material was prepared.

The prepared anode active materials:a binder:a conductive material were mixed at a weight ratio of 93:2:5, which were then dispersed in water to prepare anode slurry. This anode slurry was coated on a copper thin film, which was dried and rolled under a pressure of 3.8 MPa, thereby preparing an anode for a secondary battery.

PREPARATION EXAMPLES 2 to 6, and COMPARATIVE PREPARATION EXAMPLES 1 to 4

The artificial graphite satisfying the physical properties listed in the following Table 1 was used to prepare an anode for a lithium secondary battery in the same manner as in Preparation Example 1.

TABLE 1

| | Artificial graphite shape | Average particle diameter (μm) | Average particle diameter variation (μm) | Average pore diameter (nm) |
|---|---|---|---|---|
| Preparation Example 1 | Coarse grain type | 15 | 2.076 | 134 |
| Preparation Example 2 | Coarse grain type | 15 | 3.722 | 115 |
| Preparation Example 3 | Coarse grain type | 15 | 5.125 | 97 |
| Comparative Preparation Example 1 | Non-Coarse grain type | 18 | 0.91 | 70 |
| Comparative Preparation Example 2 | Coarse grain type | 15 | 1.227 | 158 |
| Comparative Preparation Example 3 | Coarse grain type | 15 | 6.428 | 74 |

EXAMPLES 1 to 6, and COMPARATIVE EXAMPLES 1 to 5

Lithium secondary batteries were manufactured by a general method using the anodes for a lithium secondary battery prepared in Preparation Examples 1 to 3, and Comparative Examples 1 to 3, the electrolyte solution satisfying the elements of the following Table 2 and containing 1M LiPF$_6$, and a nickel-cobalt-aluminum (NCA)-based cathode, and the characteristics of the manufactured lithium secondary battery are listed in Table 3.

TABLE 2

| | Anode | Electrolyte solution (volume ratio) | | | viscosity (cP, 25° C.) |
|---|---|---|---|---|---|
| | | EC | EMC | DEC | |
| Example 1 | Preparation Example 1 | 25 | 55 | 20 | 5.0 |
| Example 2 | Preparation Example 2 | 25 | 55 | 20 | 5.0 |
| Example 3 | Preparation Example 3 | 25 | 55 | 20 | 5.0 |
| Example 4 | Preparation Example 1 | 25 | 65 | 10 | 4.9 |
| Example 5 | Preparation Example 1 | 25 | 75 | 0 | 4.9 |
| Comparative Example 1 | Comparative Preparation Example 1 | 25 | 45 | 30 | 5.1 |
| Comparative Example 2 | Comparative Preparation Example 1 | 25 | 65 | 10 | 4.9 |
| Comparative Example 3 | Comparative Preparation Example 2 | 25 | 65 | 10 | 4.9 |
| Comparative Example 4 | Comparative Preparation Example 3 | 25 | 65 | 10 | 4.9 |
| Comparative Example 5 | Preparation Example 1 | 25 | 45 | 30 | 5.1 |

TABLE 3

| | Life characteristics (%) | | | High temperature storage characteristics (mAh) | | | Resistance characteristics (mohm) | |
|---|---|---|---|---|---|---|---|---|
| | 0$^{th}$ | 300$^{th}$ | 700$^{th}$ | Week 0 | Week 2 | Week 4 | Charge | Discharge |
| Example 1 | 100 | 96.3 | 93.3 | 1601 | 1514 | 1505 | 48.2 | 50.9 |
| Example 2 | 100 | 95.9 | 92.5 | 1611 | 1519 | 1511 | 48.6 | 49.9 |
| Example 3 | 100 | 96.0 | 92.9 | 1599 | 1508 | 1500 | 49.1 | 51.7 |
| Example 4 | 100 | 96.2 | 92.4 | 1611 | 1521 | 1512 | 50.4 | 53.2 |
| Example 5 | 100 | 96.4 | 91.8 | 1610 | 1513 | 1510 | 48.6 | 49.6 |
| Comparative Example 1 | 100 | 94.6 | 87.7 | 1537 | 1463 | 1467 | 56.4 | 60.4 |
| Comparative Example 2 | 100 | 94.5 | 87.2 | 1553 | 1477 | 1480 | 54.5 | 54.8 |
| Comparative Example 3 | 100 | 95.2 | 88.6 | 1529 | 1472 | 1467 | 56.3 | 59.2 |
| Comparative Example 4 | 100 | 95.3 | 88.0 | 1564 | 1491 | 1485 | 55.5 | 57.9 |
| Comparative Example 5 | 100 | 95.7 | 89.2 | 1569 | 1500 | 1494 | 55.6 | 55.9 |

As shown in Table 3, in Examples 1 to 5 using the anode prepared using the agglomerate artificial graphite satisfying the average pore diameter of 80 to 150 nm, and the electrolyte solution having a viscosity of 5.0 cP or less, it is confirmed that the capacity of 91.8% or more was maintained even after 700 charge-discharge experiments, thereby having very superior life characteristics, and the capacity was maintained at 1500 mAh or more even after leaving at 60° C. for 4 weeks, thereby having very superior high temperature storage characteristics, and also resistance when charging and discharging was significantly lowered, thereby having very superior resistance characteristics.

However, in Comparative Example 1 using the non-agglomerate artificial graphite, and the electrolyte solution having a viscosity of 5.1 cP, it is confirmed that the capacity was decreased to 87.7% as compared with the initial capacity after 700 charge-discharge experiments, and the capacity was decreased to 1500 mAh or less after being left at 60° C. for 4 weeks, and also the resistance characteristics were not good due to the high resistance when charging and discharging.

In addition, also in Comparative Example 2 using the electrolyte solution having the same composition as Example 1, but also using the non-agglomerate artificial graphite, the life characteristics, the high temperature storage characteristics and the resistance characteristics thereof were greatly decreased as compared with the present invention, and thus, it is confirmed that the improvement of the life characteristics, the high temperature storage characteristics and the resistance characteristic may not be expected only with the low viscosity electrolyte solution. On the contrary, also in Comparative Example 5 using the same agglomerate artificial graphite as from Example 1, but using the different composition of the electrolyte solution, the life characteristics, the high temperature storage characteristics and the resistance characteristics thereof were greatly decreased as compared with the present invention, and thus, it is confirmed that the improvement of the life characteristics, the high temperature storage characteristics and the resistance characteristic may not be expected only with the agglomerate artificial graphite.

In addition, in Comparative Examples 3 and 4 using the agglomerate artificial graphite which is a coarse grain type, but has an average pore diameter out of the range of 80 to 150 nm, though the low viscosity electrolyte solution having the same composition as Example 1 was used, the life characteristics, the high temperature storage characteristics and the resistance characteristics thereof were greatly decreased as compared with the present invention, and thus, it is confirmed that the pore size of the agglomerate artificial graphite has an important effect on the improvement of the life characteristics, the high temperature storage characteristics and the resistance characteristics by the low viscosity electrolyte solution.

The lithium secondary battery according to the present invention is manufactured by immersing an anode containing agglomerate artificial graphite having pores with an average diameter of 80 to 150 nm, prepared using agglomerate artificial graphite, in an electrolyte solution having a viscosity of 5.0 cP or less at 25° C., and thus, the battery may have an improved wetting effect, and reduced battery resistance, thereby having improved output characteristics.

In addition, as the agglomerate artificial graphite is used, the battery may have excellent life characteristics and high temperature storage characteristics.

What is claimed is:

1. A lithium secondary battery comprising: an anode containing agglomerate artificial graphite having pores with an average diameter of 80 to 150 nm; and an electrolyte solution having a viscosity of 5.0 cP or less at 25° C., wherein the agglomerate artificial graphite satisfies the following Equation 1:

$$0.1 \leq \Delta H_A/H_A \leq 0.4$$

wherein $H_A$ is an average particle diameter (μm) of the agglomerate artificial graphite; and $\Delta H_A$ is an average particle diameter variation (μm) of the agglomerate artificial graphite when applying a pressure of 4 mN/cm$^2$, wherein the electrolyte solution contains a first solvent including ethylmethyl carbonate, diethyl carbonate or a mixed solution thereof and a second solvent including at least one selected from dimethyl carbonate (DMC), dipropyl carbonate (DPC), methylpropyl carbonate (MPC), ethylpropyl carbonate (EPC), ethylene carbonate (EC), propylene carbonate (PC), and butylene carbonate (BC).

2. The lithium secondary battery of claim 1, wherein the agglomerate artificial graphite has a true density of 2 to 2.5 g/cm$^3$, and a specific surface area of 0.5 to 5 m$^2$/g.

3. The lithium secondary battery of claim 1, wherein the agglomerate artificial graphite has Lc(002) of 3.355 to 3.361 in which Lc(002) is a crystallite size in a C-axis direction when measuring an X-ray diffraction pattern.

4. The lithium secondary battery of claim 1, wherein the first solvent contains 55 to 80 vol % of ethylmethyl carbonate based on a total volume of the electrolyte solution.

5. A lithium secondary battery comprising: an anode containing agglomerate artificial graphite having pores with an average diameter of 80 to 150 nm; and an electrolyte solution having a viscosity of 5.0 cP or less at 25° C., wherein the agglomerate artificial graphite has a true density of 2 to 2.5 g/cm$^3$, and a specific surface area of 0.5 to 5 m$^2$/g, wherein the electrolyte solution contains a first solvent including ethylmethyl carbonate, diethyl carbonate or a mixed solution thereof, and a second solvent including at least one selected from dimethyl carbonate (DMC), dipropyl carbonate (DPC), methylpropyl carbonate (MPC), ethylpropyl carbonate (EPC), ethylene carbonate (EC), propylene carbonate (PC), and butylene carbonate (BC).

6. The lithium secondary battery of claim 5, wherein the agglomerate artificial graphite has Lc(002) of 3.355 to 3.361 in which Lc(002) is a crystallite size in a C-axis direction when measuring an X-ray diffraction pattern.

7. The lithium secondary battery of claim 5, wherein the first solvent contains 55 to 80 vol % of ethylmethyl carbonate based on a total volume of the electrolyte solution.

* * * * *